C. DE BOCK.
SUCKING BOTTLE.
APPLICATION FILED AUG. 7, 1911.
1,023,803.
Patented Apr. 23, 1912.
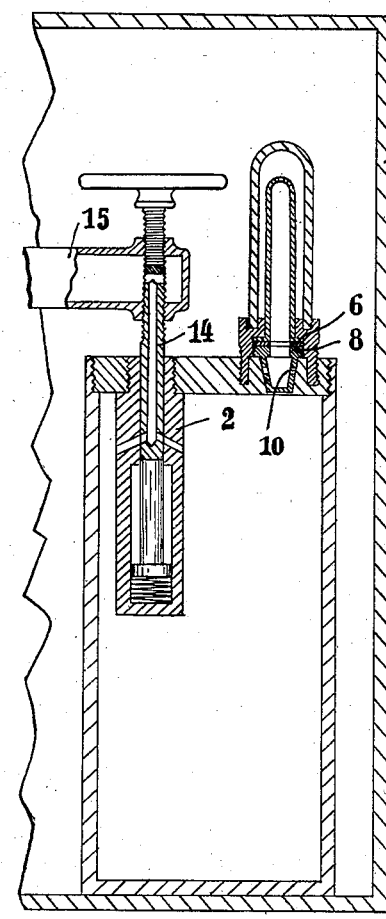
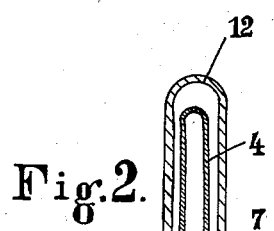
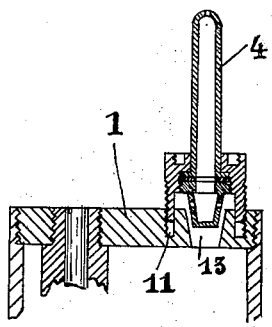
Witnesses:
V. C. Landenberger
M. Hefler
Inventor
Charles de Bock
By B. Singer
Attorney.

UNITED STATES PATENT OFFICE.

CHARLES DE BOCK, OF LELE, BELGIUM.

SUCKING-BOTTLE.

1,023,803.  Specification of Letters Patent.  Patented Apr. 23, 1912.

Application filed August 7, 1911. Serial No. 642,834.

*To all whom it may concern:*

Be it known that I, CHARLES DE BOCK, residing at Lele, Belgium, have invented certain new and useful Improvements in Sucking-Bottles; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

The present invention relates to a sucking bottle for feeding children, wherein milk and teat itself are sterilized. Said sucking bottle may be so arranged that neither the milk nor the teat comes into contact with each other nor with the outer air, nor with any other not sterilized article before the bottle is used. Said result is attained substantially by combining with the object of patent filed on 7 March 1911 a system of teat which is the particular object of the present specification.

The appended drawings show by way of example said teat applied to a sucking bottle provided with the system of communicating bolt of the receptacle and the milk pipe particularly described in the specification filed on 7 March 1911.

Figure 1 is a vertical sectional view of the sucking bottle at the moment it is sterilized. Fig. 2 shows the bottle after its sterilization during its being stored. Fig. 3 shows the bottle when used.

In the cap 1 of the sucking bottle is placed the part 2 described in the specification filed on 7 March 1911 and allowing to establish communication between the inner of the bottle placed in an autoclave 3 and a piping 15 where milk is maintained under pressure.

The teat 4 which is the object of the present patent is arranged in a screw threaded socket 5 screwed into a cap 1. Said teat may be of rubber or any other like material. The lower bead 6 of the teat 4 is pressed between an inner rim 7 of said socket 5 and an annular part 8 screwed into said socket. Said part 8 is provided at its lower end with a conical part 9 with openings 10 in the sides. The socket 5 is screwed into a circular groove 11 in the cap 1 suitably threaded.

At its upper part the socket 5 is provided with a ledge on which a bell 12 is screwed. When the socket 5 is screwed into position the conical part 9 of the part 8 engages into a conical opening 13 of the cap 1 and prevents any connection between the sucking bottle and the recess for the teat. To fill said bottle, it is placed into an autoclave 3 after the bell 12 and the socket 5 have been screwed into place (Fig. 1). By lowering in the manner known (described in the patent filed 7 March 1911) the bolt 14 connection is provided between the inner of the bottle and the piping 15. Then the autoclave is closed and the bottle filled and sterilized in any known manner. The sucking bottle so filled with sterilized milk is stored until it must be used. Then the sheath 12 is unscrewed, which covered the teat 4 and held it in a sterilized atmosphere, then the socket 5 is unscrewed. The parts are then in the position shown Fig. 3. In said position the milk may by the suction of the child, get into the teat 4 through holes 10 in the conical part 9.

It is to be noted that when a teat 4 is made in a material not altered by milk or when said material by its contact does not alter said milk while being sterilized or afterward (Fig. 1) the socket 5 could be unscrewed so as to provide, as shown Fig. 3, a connection between the inner of the receptacle and the inner of the teat and the sheath 12. It is desirable to make easy the filling to provide the sucking bottle with a valve.

Claim—

In combination with a nursing bottle, of a cover or stopper therefor having a conical opening therein and an annular threaded recess surrounding said opening, a threaded bushing secured in said recess and having an internal shoulder in the bore thereof, a conical cup seated in said conical opening and having outlets adapted to be closed thereby, said cup having a threaded portion connected with said bushing, a nipple projecting from said bushing and having a flange interposed between the shoulder of said bushing and said cup, and a cap inclosing said nipple and having threaded engagement with said bushing, substantially as described.

In testimony whereof I affix my signature in presence of two witnesses.

CHARLES DE BOCK.

Witnesses:
 GEORGES VANDER HAEGHER,
 PAUL EARLY.

Copies of this patent may be obtained for five cents each, by addressing the "Commissioner of Patents, Washington, D. C."